United States Patent
McMurrough

(10) Patent No.: US 10,007,336 B2
(45) Date of Patent: Jun. 26, 2018

(54) APPARATUS, SYSTEM, AND METHOD FOR MOBILE, LOW-COST HEADSET FOR 3D POINT OF GAZE ESTIMATION

(71) Applicant: Board of Regents, The University of Texas System, Austin, TX (US)

(72) Inventor: Christopher D. McMurrough, Arlington, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 358 days.

(21) Appl. No.: 14/482,109

(22) Filed: Sep. 10, 2014

(65) Prior Publication Data

US 2015/0070470 A1 Mar. 12, 2015

Related U.S. Application Data

(60) Provisional application No. 61/876,038, filed on Sep. 10, 2013.

(51) Int. Cl.
 *G06F 3/01* (2006.01)
 *G06K 9/00* (2006.01)
 *G06K 9/62* (2006.01)

(52) U.S. Cl.
 CPC ......... *G06F 3/013* (2013.01); *G06K 9/00604* (2013.01); *G06K 9/6211* (2013.01); *G06K 9/6212* (2013.01)

(58) Field of Classification Search
 CPC .. G06F 3/013; G06K 9/00604; G06K 9/6211; G06K 9/6212
 See application file for complete search history.

(56) References Cited

U.S. PATENT DOCUMENTS

| | | | |
|---|---|---|---|
| 3,678,283 A | 7/1972 | LaBaw | 250/216 |
| 3,806,725 A | 4/1974 | Leitz | 250/203.1 |
| 4,109,145 A | 8/1978 | Graf | 250/221 |
| 4,595,990 A | 6/1986 | Garwin et al. | 708/141 |
| 4,648,052 A | 3/1987 | Friedman et al. | 348/78 |
| 4,676,611 A | 6/1987 | Nelson et al. | 351/205 |
| 4,789,235 A | 12/1988 | Borah et al. | 351/246 |
| 4,836,670 A | 6/1989 | Hutchinson | 351/210 |
| 4,852,988 A | 8/1989 | Velez et al. | 351/210 |

(Continued)

OTHER PUBLICATIONS

Bay et al. (Speeded-up robust features (SURF), Comput. Vis. Image Underst., 110(3) (2008), pp. 346-359).*

(Continued)

*Primary Examiner* — Christopher S Kelley
*Assistant Examiner* — Maria Vazquez Colon
(74) *Attorney, Agent, or Firm* — Norton Rose Fulbright US LLP

(57) ABSTRACT

An apparatus, system, and method for a mobile, low-cost headset for 3D point of gaze estimation. A point of gaze apparatus may include an eye tracking camera configured to track the movements of a user's eye and a scene camera configured to create a three-dimensional image and a two-dimensional image in the direction of the user's gaze. The point of gaze apparatus may include an image processing module configured to identify a point of gaze of the user and identify an object located at the user's point of gaze by using information from the eye tracking camera and the scene camera.

19 Claims, 6 Drawing Sheets

(56) References Cited

U.S. PATENT DOCUMENTS

| | | | |
|---|---|---|---|
| 4,950,069 A | 8/1990 | Hutchinson | 351/210 |
| 5,204,703 A | 4/1993 | Hutchinson et al. | 351/210 |
| 5,331,149 A | 7/1994 | Spitzer et al. | 250/221 |
| 5,481,622 A | 1/1996 | Gerhardt et al. | 382/103 |
| 5,583,335 A | 12/1996 | Spitzer et al. | 250/221 |
| 5,585,813 A | 12/1996 | Howard | 345/8 |
| 6,120,461 A | 9/2000 | Smyth | 600/558 |
| 6,359,601 B1 | 3/2002 | Maguire, Jr. | 345/7 |
| 6,943,754 B2 | 9/2005 | Aughey et al. | 345/8 |
| 7,130,447 B2 | 10/2006 | Aughey et al. | 382/103 |
| 7,736,000 B2 | 6/2010 | Enriquez et al. | 351/210 |
| 7,866,818 B2 | 1/2011 | Schroeder et al. | 351/206 |
| 7,963,652 B2 | 6/2011 | Vertegaal et al. | 351/205 |
| 8,342,687 B2 | 1/2013 | Blixt et al. | 351/210 |
| 8,433,612 B1 | 4/2013 | Sharma et al. | 705/14.41 |
| 9,072,929 B1* | 7/2015 | Rush | A63B 24/0062 |
| 9,164,580 B2* | 10/2015 | Katz | G06F 3/013 |
| 9,342,610 B2* | 5/2016 | Liu | G02B 27/017 |
| 2005/0286767 A1* | 12/2005 | Hager | G06K 9/00208 382/190 |
| 2012/0133891 A1* | 5/2012 | Jiang | H04N 5/3535 351/210 |
| 2013/0321772 A1* | 12/2013 | White | A61B 3/113 351/209 |
| 2014/0192050 A1* | 7/2014 | Qiu | G06K 9/00214 345/420 |
| 2014/0336781 A1* | 11/2014 | Katyal | A61F 2/72 623/25 |

OTHER PUBLICATIONS

Bay, A. Ess, T. Tuytelaars, and L. Van Gool. Speeded-Up Robust Features (SURF). Computer Vision and Image Understanding, 110(3):346-359, Jun. 2008.

Fischler and R. C. Bolles. Random sample consensus: a paradigm for model tting with applications to image analysis and automated cartography. Communications of the ACM, 24(6):381-395, Jun. 1981.

Laganiere. OpenCV 2 Computer Vision Application Programming Cookbook. Packt Publishing, Jun. 2011.

Li, J. Babcock, and D. J. Parkhurst. openEyes: a low-cost head-mounted eye-tracking solution. In *Proceedings of the 2006 symposium on Eye tracking research & applications—ETRA '06*, p. 95, New York, New York, USA, 2006. ACM Press.

Lieberman, C. Sugrue, T. Watson, J. Powderly, E. Roth, and T. Quan. The EyeWriter, 2009.

McMurrough, J. Rich, C. Conly, V. Athitsos, and F. Makedon. Multi-Modal Object of Interest Detection Using Eye Gaze and RGB-D Cameras. In Proceedings of the 4th Workshop on Eye Gaze in Intelligent Human Machine Interaction—Gaze-In '12, New York, New York, USA, 2012. ACM Press.

Milner and M. Goodale. The Visual Brain in Action. Oxford University Press, Oxford, UK, $2^{nd}$ edition, 2006.

Mulvey, A. Villanueva, D. Sliney, R. Lange, S. Cotmore, and M. Donegan. D5 . 4 Exploration of safety issues in Eyetracking. Technical report, Communication by Gaze Interaction (COGAIN), 2008.

Pasian, F. Corno, I. Signorile, and L. Farinetti. The Impact of Gaze Controlled Technology on Quality of Life. In *Gaze Interaction and Applications of Eye Tracking: Advances in Assistive Technologies*, chapter 6, pp. 48-54. IGI Global, 2012.

Pirri, M. Pizzoli, and A. Rudi. A general method for the point of regard estimation in 3D space. In CVPR 2011, pp. 921-928. IEEE, Jun. 2011.

Swirski, Bulling, and Dodgson, *Robust Real-Time Pupil Tracking in Highly Off-Axis Images*, ETRA '12 Proceedings of the Symposium on Eye Tracking Research and Applications, pp. 173-176, 2012.

Rusu and S. Cousins. 3D is here: Point Cloud Library (PCL). In 2011 IEEE International Conference on Robotics and Automation, pp. 1-4. IEEE, May 2011.

San Agustin, H. Skovsgaard, J. P. Hansen, and D. W. Hansen. Low-cost gaze interaction: ready to deliver the promises. In *Proceedings of the $27^{th}$ international conference extended abstracts on Human factors in computing systems—CHI EA '09*, p. 4453, New York, New York, USA, 2009. ACM Press.

Takemura, Y. Kohashi, T. Suenaga, J. Takamatsu, and T. Ogasawara. Estimating 3D point-of-regard and visualizing gaze trajectories under natural head movements. In *Proceedings of the 2010 Symposium on Eye-Tracking Research & Applications—ETRA '10*, vol. 1, p. 157, New York, New York, USA, 2010. ACM Press.

Winfield and D. Parkhurst. Starburst: A hybrid algorithm for video-based eye tracking combining feature-based and model-based approaches. *2005 IEEE Computer Society Conference on Computer Vision and Pattern Recognition (CVPR'05)—Workshops*, 3:79-79, 2005.

\* cited by examiner

APPARATUS, SYSTEM, AND METHOD FOR MOBILE, LOW-COST HEADSET FOR 3D POINT OF GAZE ESTIMATION

RELATED APPLICATION

This application claims priority to U.S. Provisional Patent Application 61/876,038 entitled "Apparatuses, System, and Method for Mobile, Low-Cost Headset for 3D Point of Gaze Estimation," and filed on Sep. 10, 2013, the entire contents of which are incorporated herein by reference without disclaimer.

STATEMENT REGARDING FEDERALLY-SPONSORED RESEARCH

This invention was made with government support under grant numbers CNS 0923494, CNS 1035913, and IIS 1238660 awarded by the National Science Foundation. The government has certain rights in the invention.

BACKGROUND OF THE INVENTION

1. Field of Invention

This invention relates to 3D point of gaze apparatus and more particularly relates to an apparatus system and method for mobile, low-cost, head-mounted, 3D point of gaze estimation.

2. Description of Related Art

Eye gaze based interaction has many useful applications in human-machine interfaces, assistive technologies, and multimodal systems. Traditional input methods, such as the keyboard and mouse, are not practical in many situations and can be ineffective for some users with physical impairments. Knowledge of a user's point of gaze (PoG) can be a powerful data modality in intelligent systems by facilitating intuitive control, perception of user intent, and enhanced interactive experiences.

Gaze tracking devices have proven to be extremely beneficial to impaired users. In one case study presented (V. Pasian, F. Corno, I. Signorile, and L. Farinetti. The Impact of Gaze Controlled Technology on Quality of Life. In *Gaze Interaction and Applications of Eye Tracking: Advances in Assistive Technologies*, chapter 6, pages 48-54. IGI Global, 2012.) sixteen amyotrophic lateral sclerosis (ALS) patients with severe motor impairments (loss of mobility, unable to speak, etc.) were introduced to eye tracking devices during a 1-2 week period. The patients were assessed by a psychologist during an initial meeting in order to evaluate their general quality of life. Eye tracking devices and proper training, as well as access to a speech and language therapist and a computer engineer, were provided for the duration of the study. Patients completed questionnaires related to their experiences with the equipment several times during the study. Several patients reported a clear positive impact on their quality of life during the study, resulting from the enhanced communication facilitated by the eye tracking devices over other non-gaze based assistive devices.

While the utility of gaze interaction in a variety of applications has been demonstrated, the availability of the technology has been a limiting factor in more widespread use. Due to the relatively high monetary cost and proprietary nature associated with commercial eye tracking equipment and software, several low-cost solutions have been developed using inexpensive on-the-shelf components. Many of these designs have been made publicly available through the open source community. The openEyes project (D. Li, J. Babcock, and D. J. Parkhurst. openEyes: a low-cost head-mounted eye-tracking solution. In *Proceedings of the 2006 symposium on Eye tracking research & applications—ETRA '06*, page 95, New York, N.Y., USA, 2006. ACM Press.) presents a low-cost head-mounted eye tracker that uses a pair of inexpensive IEEE-1394 cameras to capture images of both the eye and scene. This hardware device, coupled with the open source Starburst algorithm, facilitates estimation of the user PoG in the 2D scene image. A similar open source project, the EyeWriter, provides detailed build instructions for creating a head-mounted eye tracker from a modified Playstation Eye USB camera. The project was designed to enable digital drawing by eye gaze control for artists with ALS while using the device with the accompanying open source software. Interestingly, in J. San Agustin, H. Skovsgaard, J. P. Hansen, and D. W. Hansen. Low-cost gaze interaction: ready to deliver the promises. In *Proceedings of the 27$^{th}$ international conference extended abstracts on Human factors in computing systems—CHI EA '09*, page 4453, New York, N.Y., USA, 2009. ACM Press., the effectiveness of a low-cost eye tracker is shown to be comparable to that of commercial devices for target acquisition and eye-typing activities.

The head-mounted eye gaze systems mentioned above facilitate effective interactive experiences with some limiting constraints. In general, these solutions are designed for interaction with fixed computer displays or 2D scene images. These types of systems provide a 2D PoG, which does not directly translate into the 3D world. An accurate estimate of the 3D user PoG can be especially useful in mobile applications, human-robot interaction, and in designing intelligent assistive environments. Knowledge of the 3D PoG within an environment can be used to detect user attention and intention to interact, leading to multimodal attentive systems able to adapt to the user state.

Some mobile 3D PoG tracking systems have been proposed in literature. For example, a head-mounted multi-camera system has been presented that estimates the 3D PoG by computing the intersection of the optical axis of both eyes. This approach gives the 3D PoG relative to the user's frame of reference, but does not provide a mapping of this point to the environment in which the user is present. A similar stereo camera approach is presented in K. Takemura, Y. Kohashi, T. Suenaga, J. Takamatsu, and T. Ogasawara. Estimating 3D point-of-regard and visualizing gaze trajectories under natural head movements. In *Proceedings of the 2010 Symposium on Eye-Tracking Research & Applications—ETRA '10*, volume 1, page 157, New York, N.Y., USA, 2010. ACM Press., which also includes a forward-facing scene camera for mapping of the 3D PoG to scene coordinates. While multi-camera approaches such as these provide a 3D PoG, their use is limited by increased uncertainty at increasing PoG depths. Another limiting factor is the scene camera, which is generally a standard 2D camera that does not provide any 3D information of the environment itself.

SUMMARY OF THE INVENTION

An point of gaze apparatus is presented. In one embodiment, the apparatus includes an eye tracking camera configured to track the movements of a user's eye. In some embodiments, a scene camera may be configured to create a three-dimensional image and a two-dimensional image in the direction of the user's gaze. In addition, in some embodiments, the point of gaze apparatus may include an image processing module that is configured to identify a point of gaze of the user and identify an object located at the user's point of gaze. The point of gaze apparatus may identify the object by using information from the eye tracking camera and the scene camera.

In some embodiments, the apparatus may include an illumination source configured to illuminate the user's eye. For example, the illumination source may be an infrared light emitting diode. In some embodiments, the eye tracking camera may include an infrared pass filter.

In some embodiments, the eye tracking camera and scene camera of the point of gaze apparatus may be mounted on a wearable headset. Furthermore, the scene camera may be an RGB-D camera.

In some embodiments, a point of gaze apparatus may include a means for tracking the movement of an eye. The means for tracking may be a USB camera, for example. The point of gaze apparatus may include a means for imaging a scene. The means for imaging the scene may be an RGB-D camera, for example. Furthermore, the point of gaze apparatus may include a means for using information gathered by the means for tracking and information from the means for imaging to identify an object seen by the eye. The means for imaging may be a general purpose computer programmed to perform the steps disclosed in the flow chart of FIG. 6. Furthermore, in some embodiments, the point of gaze apparatus may include a means for mounting the means for tracking and means for imaging to a user's head. For example, the means for mounting may be a pair of goggles or glasses that a user can wear.

A method is also presented for estimating a point of gaze. The method in the disclosed embodiments substantially includes the steps necessary to carry out the functions presented above with respect to the operation of the described apparatus and system. In one embodiment, the method includes tracking the movement of a user's eye with an eye tracking camera. In addition, in one embodiment, the method may include obtaining a three-dimensional image and a two-dimensional image in the direction of the user's gaze. Furthermore, the method may include identifying an object in a point of gaze of the user using the eye tracking camera, three-dimensional image, and two dimensional image.

In some embodiments, tracking the movement of the user's eye may include measuring a corneal reflection of the user's eye. In some embodiments, the method may include calibrating the eye tracking camera before tracking the movement of the user's eye. Furthermore, according to the disclosed methods, the user's point of gaze may be calculated using a pupil tracking algorithm. In some embodiments, identifying the object may include identifying a euclidean cluster in the three-dimensional image closest to the user's point of gaze. Furthermore, the method may include identifying a region of interest in the euclidean cluster and identifying a shape of the object from points in the region of interest. For example, identification of the shape of the object may be performed using the RANSAC algorithm.

In some embodiments, the method may include using a region of the two-dimensional image corresponding to the image cluster to identify the object. In addition, the region of the two-dimensional image may be compared to a reference image. For example, the comparison may be performed using the SURF method.

In some embodiments, identifying the object may include comparing a histogram of a region of the two-dimensional image near the near the point of gaze to a reference histogram.

In some embodiments, the method may include calculating a plurality of geometric classification match scores between the object and a plurality of reference objects. For example, the method may include calculating a plurality of keypoint match scores between the object and the plurality of reference objects. In addition, the method may include calculating a plurality of histogram comparison scores between the object and the plurality of reference object. Also, the method may include identifying a reference object based on the sum of geometric classification match score, keypoint match score, and histogram comparison score. In some embodiments, the sum is a weighted sum.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF ILLUSTRATIVE EMBODIMENTS

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

This application discloses a novel head-mounted system that provides additional data modalities that are not present in previous solutions. We show that the effective integration of these modalities can provide knowledge of gaze interaction with environmental objects to aid the development of intelligent human spaces. The solution considers three key data modalities for 3D PoG estimation and environment interaction in real-time. First, an eye tracking camera is used to estimate the 2D PoG. Next, an RGB-D scene camera is used to acquire two additional modalities: A 3D representation of the environment structure and a color image in the direction of the user's gaze. Then, according to methods disclosed herein the 2D PoG is transformed to 3D coordinates, and show that the objects are able to be identified using a combination of computer vision techniques and 3D processing. The disclosed experimental results show that accurate classification results are achieved by combining the multiple data modalities.

Figure 1:
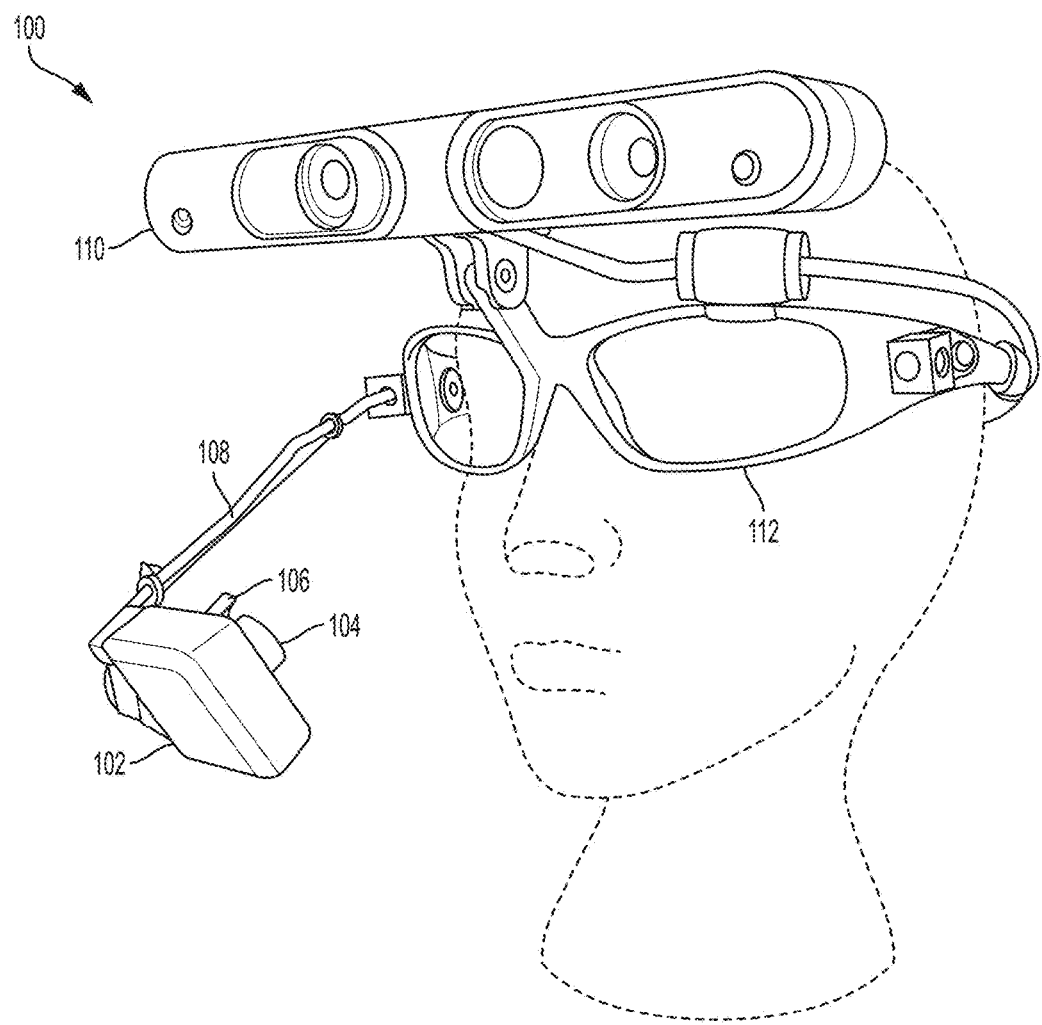
FIG. 1 is a headset hardware solution for a 3D Point of Gaze apparatus.

The solution presented in this disclosure is designed to provide information about the environment existing around the user, together with the points or areas within the environment that the user interacts with visually. In order to realize these goals, a wearable headset was developed that provides a 3D scan of the area in front of the user, a color image of this area, and an estimate of the user's visual PoG. These three data modalities are provided by an eye tracking camera, which observes the user's eye motions, and a forward facing RGB-D camera, providing the scene image and 3D representation. These two components are mounted on rigid eyeglass frames such that their position remains fixed relative to the user's head during movement. An example of a complete headset hardware solution is shown in FIG. 1.

Eye Tracking Camera

In one embodiment, the system eye tracking feature is accomplished using an eye tracking camera 102 (such as an embedded USB camera module) equipped with an infrared pass filter 104. The user's eye is illuminated with a single infrared LED 106 to provide consistent image data in various ambient lighting conditions. The LED 106 also produces a corneal refection on the user's eye, which can be seen by the eye tracking camera 102 and exploited to enhance tracking accuracy. The LED 106 may be chosen according to particular guidelines to ensure that the device can be used safely for indefinite periods of time.

The eye tracking camera 102 is positioned such that the image frame is centered in front of one of the user's eyes. The module can be easily moved from the left or right side of the headset frame so that either eye may be used (to take advantage of user preference or eye dominance), while fine adjustments to the camera position and orientation are possible by manipulating the flexible mounting arm 108. In some embodiments, streaming video frames from the eye tracking cameral 102 are provided with a resolution of 640×480 at a rate of 30 Hz, which facilitates accurate tracking of the pupil and corneal reflection using computer vision techniques.

Scene RGB-D Camera

Information about the user's environment may be provided, for example, by a forward-facing RGB-D camera, such as the Asus XtionPRO Live. This device provides a 640×480 color image of the environment along with a 640×480 depth range image at a rate of 30 Hz. The two images are obtained from individual imaging sensors and registered by the device such that each color pixel value is assigned actual 3D coordinates in space. This provides a complete scanning solution for the environment in the form of 3D "point clouds", which can be further processed in software.

Computational Approach

This section describes the computational approach that may be used for object of interest identification and classification. In general, the four steps of the process are to: 1) estimate the PoG using the eye and scene cameras, 2) assign a geometric classification based on the 3D object of interest structure, 3) perform visual classification using SURF feature matching, color histograms, and, 4) fuse the multimodal data for a final result.

Point of Gaze Estimation

Figure 2A:
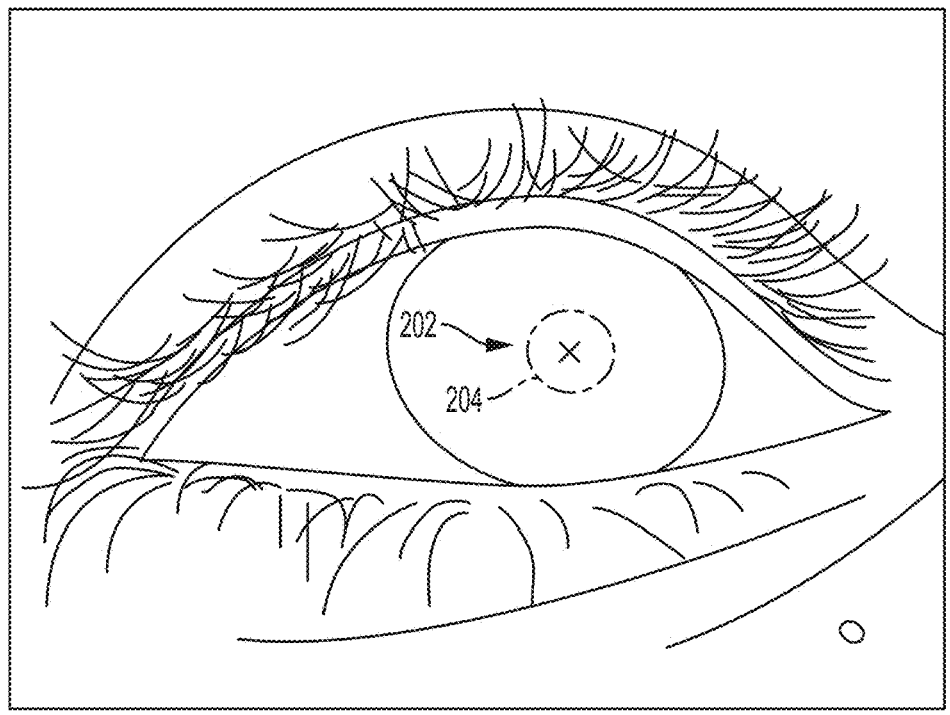
FIG. 2A is an image of an eye to illustrate calculations made to determine a user's point of gaze.

An estimate of the user PoG may be computed using a pupil tracking algorithm. For example, a modified version of the starburst algorithm presented in D. Winfield and D. Parkhurst. Starburst: A hybrid algorithm for video-based eye tracking combining feature-based and model-based approaches. 2005 *IEEE Computer Society Conference on Computer Vision and Pattern Recognition* (CVPR'05)—*Workshops,* 3:79-79, 2005 may be used. This algorithm creates a mapping between pupil positions and 2D scene image coordinates after a simple calibration routine is performed. During the pupil detection phase of the algorithm, an ellipse is fitted to the pupil such that the ellipse center provides an accurate estimate of the pupil center. The center of the infrared corneal reflection is detected during the next phase of the algorithm, which can then be used together with the pupil center coordinates to create the calibration mapping. Another pupil tracking algorithm that may be used is described in *Robust Real-Time Pupil Tracking in Highly Off-Axis Images,* ETRA '12 Proceedings of the Symposium on Eye Tracking Research and Applications, pp. 173-176, 2012. FIG. 2A shows a graphical representation of a fitted pupil ellipse 202 around a pupil 204 computed from a single eye tracking camera 102 image frame.

The mapping from pupil coordinates 208 to 2D scene image coordinates may be accomplished, in one embodiment, by a nine-point calibration procedure. During calibration, the user sequentially gazes upon nine different points in the scene image. The pupil coordinates for each calibration point is saved, and the nine point mapping is used to interpolate a 2D PoG from future eye tracking camera frames. The 3D PoG can be obtained from the 2D points by looking up the 3D coordinates of the pixel in the point cloud data structure provided by the RGB-D camera. Exploitation of the RGB-D point cloud structure removes the need for stereo eye tracking during 3D PoG estimation as used in other methods.

Figure 2B:
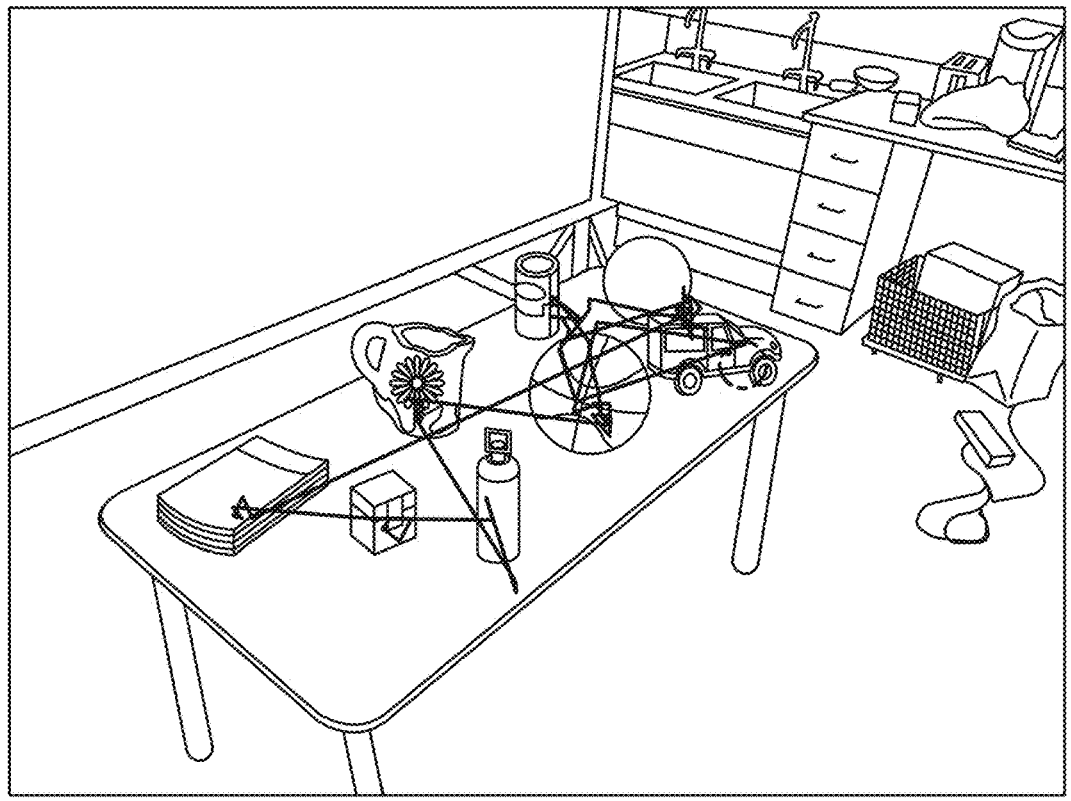
FIG. 2B shows a user's gaze as he or she scans a table with objects.

FIG. 2B shows a user's gaze as he or she scans a table with objects.

Geometric Classification

Point cloud manipulation may be performed with the utilization of the Point Cloud Library (PCL). PCL provides the methods necessary to extract information from point clouds, the contribution presented in this section is the overall process for which the given methods are applied.

Instead of applying the model segmentation on the initial point cloud, a series of operations may be performed on the point cloud to remove points that are not of interest. A large portion of the point cloud is comprised of these points, which include the points that correspond to the floor, wall, or ceiling, and the points that lie outside the area of interest. One can assume these points are not of interests due to the fact that points of interest must provide interactivity and lie within a reasonable distance to the user's PoG.

Planar models may be quicker to detect than more complex models, such as cylinders or spheres, so may be beneficial to remove large planes from the point cloud prior to detecting the models belonging to the more interactive geometries. Planes corresponding to tables, walls, the ceiling or floor, will span a large portion of the point cloud. Due to this it will not be necessary to perform the planar segmentation on the full point cloud, and down sampling of the point cloud can be performed. This will provide a performance increase since the fidelity of the point cloud is reduced, while allowing large models to maintain their structure within the point cloud. The removal of these large planes from the point cloud is useful in reducing the point cloud size, as these will not provide valuable interaction for the user.

Objects that are of interest are comprised of several points that are relatively close together and are not disjoint. PCL provides a method to detect the euclidean clusters within a point cloud. These clusters are found by linking points together that are within a defined distance threshold, which further emphasizes the importance of removing large planes, since they will connect clusters that otherwise would be disjoint. After the clusters are identified, the PoG is combined with the point cloud to determine the cluster closest to the PoG. This cluster is extracted from the point cloud. The extracted cluster provides a region of interest within the original point-cloud, and the final model segmentation is performed on the subset of points from the initial point cloud that lie inside the area of the extracted cluster region. When segmenting smaller objects, higher fidelity is needed with the point cloud, which is why the region must be taken from the original high-fidelity point cloud. When model segmentation is performed on this final point cloud, cylinder and sphere models are detected. Model parameter estimation may be done using the RANSAC algorithm. This model parameter estimation is also done in similar fashion when estimating the planar coefficients discussed previously. Final model classification is assigned based on the results of the segmentation over each of the specified models. The currently-available geometric classifications belong to the set {cylinder, sphere, other}.

Figure 3A:
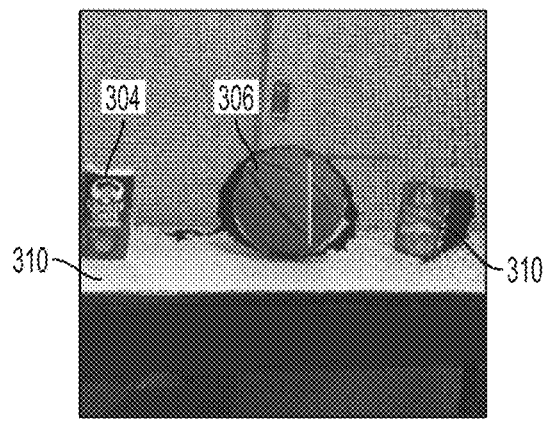
FIGS. 3A-3F show the results of a disclosed method for identifying an object at a user's point of gaze.
Figure 3B:
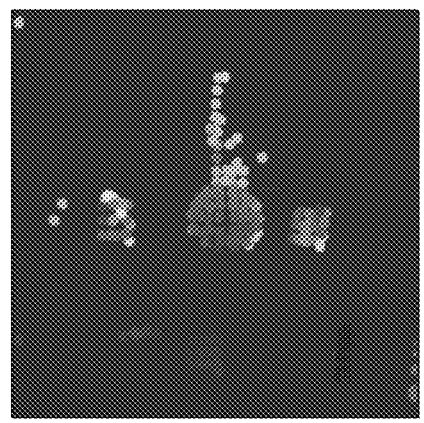
Figure 3C:
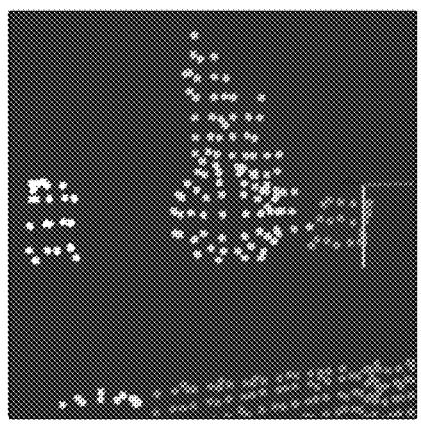
Figure 3D:
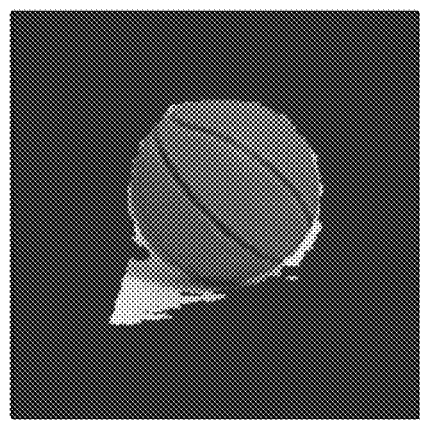
Figure 3E:
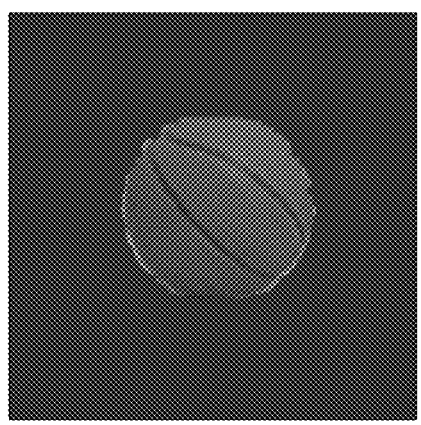
Figure 3F:
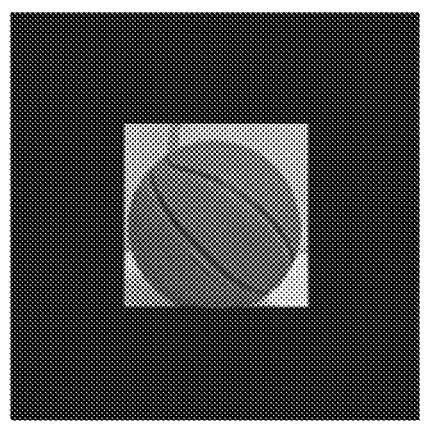

FIGS. 3A-3F show the results of manipulating a point cloud to identify an object of interest. FIG. 3A shows an original point cloud of a scene. In this example there are three potential objects of interest, oatmeal 304, a basketball 306 and raisins 308, all set on a table 310. In FIG. 3B, the planes of the table 310 and walls have been removed, leaving only the three potential object of interest. In FIG. 3C, the euclidean clustering is performed to identify the point cloud clusters around the object of interest. In FIG. 3D, the euclidean cluster belonging to the basketball is selected as being in the users PoG. In FIG. 3E, segmentation is performed to detect the shape of the model of interest (cylinder, sphere, or other). In FIG. 3F, a portion of the 2D image corresponding to the object of interest is cropped to include only the object of interest.

Following the geometric classification, analysis is performed on the cropped RGB data to further classify the object. The input for these methods consists of the geometric classification and a cropped 2D RGB image representing the final extracted point cloud. The cropped image comes from creating a bounding box relative to the 2D RGB image of the region of interest containing the extracted cluster.

SURF Feature Matching

In order to reliably identify a query object by image comparison, there needs to be similarity between image features. Since it is unlikely that the object being identified will be in the same orientation and position relative to the reference image, it is important to calculate features that are reproducible at different scales and viewing angles. Speeded Up Robust Features (SURF) is an efficient method to find such features, called keypoints, and calculate their descriptors, which contain information about the grayscale pixel intensity distribution around the keypoints.

The system maintains a knowledge base of SURF features and descriptors for all reference object images. For these images, the keypoints and descriptors are precomputed and stored to avoid recalculation each time an object is to be identified. The feature/descriptor calculations for the query object images, on the other hand, are necessarily performed on-the-fly as object identifications are requested.

Figure 4:
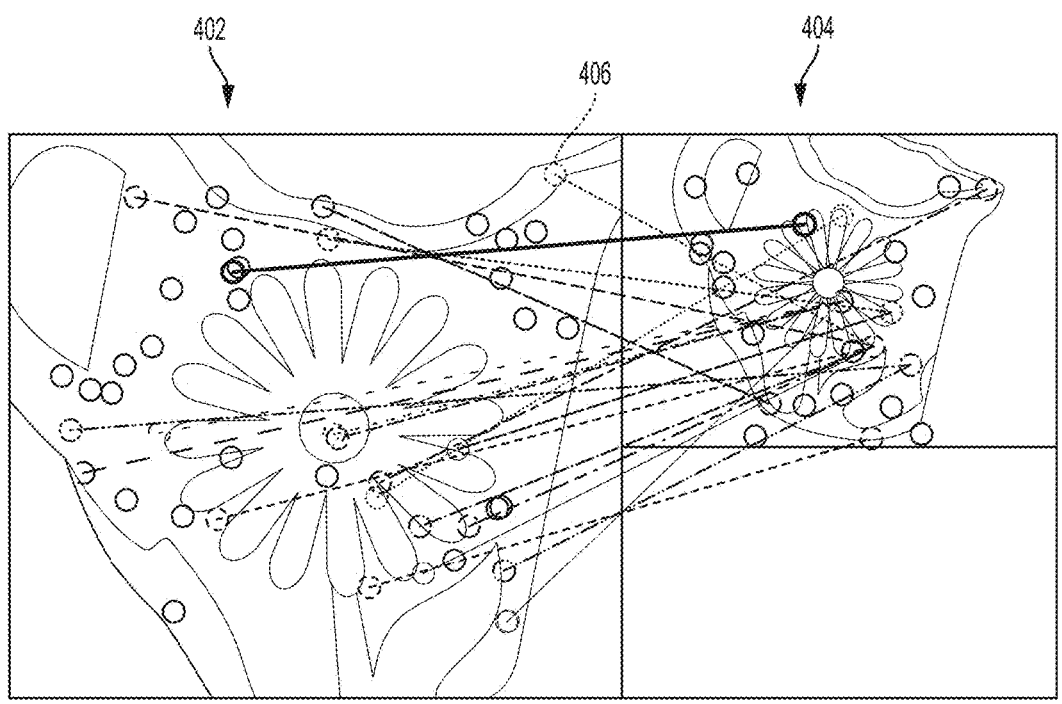
FIG. 4 shows an example of using SURF keypoint matches to identify an object.

In the SURF-based object identification we perform, the query object image keypoints are compared to those of each reference object image to determine similarity. One method is to use a modified version of the robust feature matching approach described in R. Laganiere. OpenCV 2 Computer Vision Application Programming Cookbook. Packt Publishing, June 2011, to do so. A k-nearest-neighbors search is performed to match each keypoint descriptor in the query image with the two most similar descriptors in the reference image, and vice versa. These matches enter a series of tests to narrow down the list of those that are accepted. First, if the two nearest-neighbor matches are too similar to reliably determine which is the better match, neither is used. Otherwise, the best match is tentatively accepted. FIG. 4 shows several keypoint matches at this stage. Second, if a keypoint matching from the query image to the reference image is not also a match from the reference image to the query image, it is rejected. The surviving keypoint matches are validated using the epipolar constraint so that any matched points not lying on corresponding epipolar lines are rejected, and the number of remaining matches is stored for each image in the knowledge base.

FIG. 4 shows an example of using SURF keypoint matches to identify an object. The algorithm compares and matches keypoints 406 in a query image 402 to keypoints in a reference image 404.

Histogram Matching

Since multiple objects can produce similar features in SURF calculations, it may be beneficial to incorporate color information into object identification. One may use color histograms to do so, since they provide a convenient way to represent the distribution of colors in an image and can easily and efficiently be compared. To minimize the effect on histogram matching of potential differences in brightness and contrast between reference and query images, a normalized red-green (RG) color space may be used for the calculations.

The histograms we used contain eight bins in each dimension. So, for the normalized RG color space, we used 2-dimensional 8×8 histograms for a total of sixty-four bins. As with the SURF keypoints/descriptors, the histograms for the reference object images are computed and stored in the knowledge base for easy comparison later, while the histograms for the test images are calculated at identification time. To identify a query object by histogram matching, the similarity between the query image histogram and each reference image histogram is calculated using normalized cross-correlation to obtain a value in the range [−1, 1].

Data Fusion and Object Identification

To most reliably identify the object of interest, one may effectively incorporate the data from SURF feature matching, geometric classification, and histogram comparison into a single score for each object in the reference set.

For example, after SURF keypoint match calculations, the number of keypoints matched from the query object image to each reference object image is stored as a raw score, n for that particular reference object. A final, normalized SURF score $\alpha \in [0; 1]$ is calculated for each reference object i:

$$\alpha_i = \frac{n_i}{m},$$

for $m = \max_i (n_i)$

Similarly, normalized cross-correlation values obtained from the histogram comparisons are stored for each reference object image as a raw histogram score, $h \in [-1; 1]$. A final normalized histogram score $\beta \in [-1, 1]$ is calculated for each object i:

$$\beta_i = \frac{h_i}{k},$$

for $k = \max_i (h_i)$

The third score we calculate is a simple geometric classification match score $\gamma_i$ for each reference object image i. To determine $\gamma_i$, the query image's detected classification c is compared to the reference classification $d_i$:

$$\gamma_i = \begin{cases} 1 & : c = d_i \\ 0 & : c \neq d_i \end{cases}$$

A final score $S_i$ is calculated for each object i as a linear combination of the three scores. To do so, the SURF, histogram, and geometric scores are assigned weights, $w_\alpha$, $w_\beta$, $w_\gamma$ ω ω, w, and w respectively:

$$S_i = \omega_\alpha \alpha_i + \omega_\beta \beta_i + \omega_\gamma \gamma_i$$

The object O can now be identified as:

$$O = \underset{i}{\operatorname{argmax}} (S_i)$$

EXAMPLE

Figure 5:
FIG. 5 shows an experimental setup for using a point of gaze apparatus.

Referring to FIG. 5, to assess the ability of the system to identify the object gazed upon by the user 502, we created an experiment to reproduce a typical usage application in which the user is seated at a table and desires assistance with an item 504 on the table. The user might, for example, desire some water from a pitcher on the table, but be unable to reach for the object or request assistance through verbal means or gesturing.

To this end, we used the system software to create a knowledge base of known objects and placed an assortment of test items on the table to evaluate the system's ability to estimate the user's point of gaze, use that information to isolate the object of interest, and perform successful identification.

Experimental Setup

During our experiment, a participant 502 sat in multiple positions in front of a table with an assortment of objects placed on top. They were free to move their head, eyes, and body. We instructed the participant to focus their gaze on an object and notify us with a verbal cue when this was accomplished. On this cue, a trigger event for the system to identify the object was issued. The PoG calibration was performed prior to system use, and the calibration result was checked for validity. In the experiment, the participant focused his gaze on each of the objects from three different locations at distances of up to 2 meters. Calibration may be done by looking at known positions in a set order. For example, one can place a red dot on a wall and collect gaze points as the user moves his or her head slightly (so that the pupils move while following the dot). In addition a "calibration wand" may be used to give the user a point on which to focus during the calibration routine.

Data was acquired using the headset described above, while computations were performed in real-time on a Lenovo Ideapad Y560 laptop running the Linux operating system. The laptop was equipped with a 2.20 GHz Core i7 processor with 4 GB DDR3 1333 memory.

The knowledge base used for image comparison and identification consisted of fifteen objects that varied in size from a baseball to a musical keyboard. Each object had two previously-collected training images from different angles and distances, which had been obtained using the same headset and automatically cropped via the method described above.

Experimental Results

After running the experiments, the raw scores of the image comparisons were processed to determine the optimal values for the three weights discussed above. Once the score weights were adjusted, the results were collected and analyzed. Table 1 shows the object identification accuracy for the various classifiers in the system, both individually and in combination.

TABLE 1

Object identification results

| Classifier | Accuracy |
| --- | --- |
| SURF Matching | 0.711 |
| Histogram Matching | 0.622 |

TABLE 1-continued

Object identification results

| Classifier | Accuracy |
|---|---|
| SURF + Histograms | 0.756 |
| SURF + Histograms + Geometry | 0.844 |

As can be seen from the results, the ability to identify the object of a user's gaze significantly improves as additional classifiers are added. Since SURF feature matching is a popularly used method of object matching, we use its accuracy as a baseline for our analysis. We see a significant 18.7% increase in correct object identifications by incorporating color histogram and geometric classification data with SURF matching. These results clearly illustrate the benefit of fusing multiple data modalities. The average execution times, in seconds, for each step in the identification method are presented in Table 2.

TABLE 2

Table of average runtimes

| Classifier | Execution time (s) |
|---|---|
| Geometric Classification | 0.329 |
| SURF Matching | 0.201 |
| Histogram Matching | 0.001 |

The systems and methods disclosed herein illustrate impact of combining PoG estimation techniques with low-cost 3D scanning devices such as RGB-D cameras. The data modalities provided by the headset can be analyzed in such a way that user intent and visual attention can be detected and utilized by other environment actors, such as caregivers or robotic agents.

The results of the experiment show that the combination of classification methods using multiple data modalities increases overall accuracy. Weighting the individual classification methods in the final data fusion step allows for a higher emphasis to be placed on different modalities at different times, which could facilitate dynamic adjustment of weights based on external factors such as lighting conditions.

While the experimental portion of this work focused mainly on 3D object recognition, the 3D PoG estimation provided by the combination of eye tracking and RGB-D modalities is extremely useful by itself. The utility of this approach warrants further investigation and comparison with existing 3D PoG methods, such as stereo eye tracking. Given that the inclusion of the RGB-D scene camera removes the need for multiple eye tracking cameras, it follows that the area obstructed by optical devices in the user's field of vision would be minimized. The trade-off between multiple eye tracking cameras and a bulkier RGB-D scene camera will likely improve significantly with time as the technology matures and miniaturizes.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
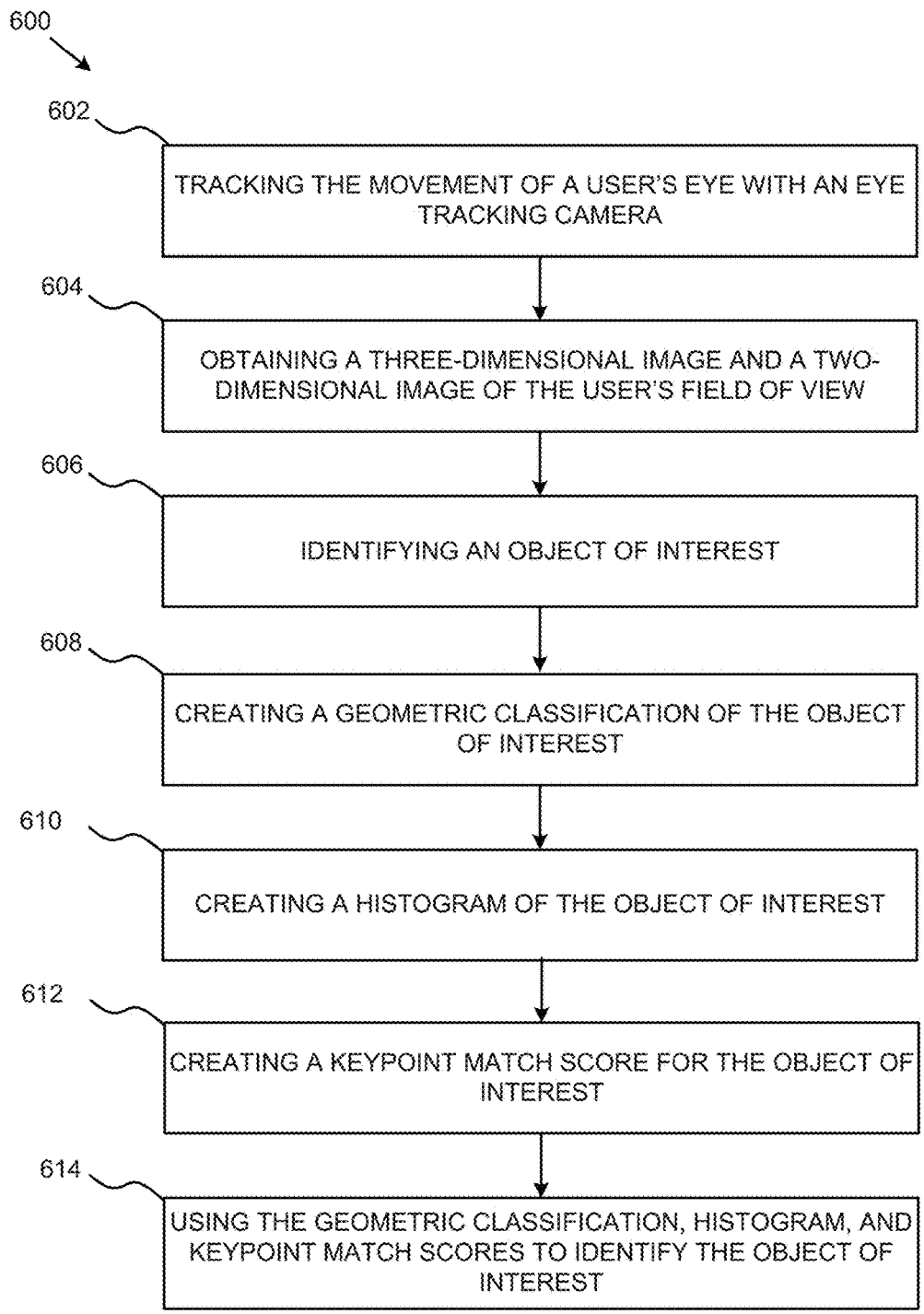
FIG. 6 is a flow chart for a method of using a point of gaze apparatus.

FIG. 6 illustrates one embodiment of a method 600 for use with a mobile, low-cost headset for 3D point of gaze estimation. In one embodiment, the method 600 includes the step 602 of tracking the movement of a user's eye with an eye tracking camera. As discussed above, the eye tracking camera may be a USB camera mounted on a headset. At step 604, the method includes the step of obtaining a three-dimensional image and a two-dimensional image of the user's field of view. The two images may be obtained using an RGB-D camera. At step 606 the method may include the step of identifying an object of interest. The object of interest may be a euclidean cluster in the 3D point cloud or a cropped image in the 2D image. At step 608, the method may include the step of creating a geometric classification of the object of interest. For example, the object of interest may be identified as a sphere or a cylinder. At step 610 the method may include creating a histogram of the object of interest. The histogram may describe the colors exhibited by the object. At step 612, the method may include the step of creating a keypoint match score for the object of interest. As described above, the keypoint match score may be computed using the SURF algorithm. Finally, the method may include the step of using the geometric classification, histogram, and keypoint match score to identify the object of interest. In some embodiments, the geometric classification, histogram, and keypoint match score may be weighted to increase the accuracy of the method in identifying the object.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. For example, in some embodiments, a histogram may be particularly helpful (and therefore more heavily weighted) if the objects of interest are color-coded. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

The invention claimed is:

1. A mobile point of gaze apparatus capable of being mounted to the head of a user, comprising:
    (a) an eye tracking camera configured to generate information associated with movements of a user's eye;
    (b) a scene camera configured to create a three-dimensional image and a two-dimensional image in a direction of a user's gaze; and
    (c) an image processing module configured to identify a point of gaze of the user and identify an object located at the user's point of gaze based on information from the eye tracking camera and the scene camera, wherein the image processing module is configured to identify the object by:
generating an initial model of a scene using the information from the scene camera;
generating a reduced model of the scene that omits one or more portions of the initial model, wherein the one or more portions of the initial model that are omitted from the reduced model correspond to portions that are not used to identify objects within the initial model;
identifying one or more clusters within the reduced model; and
identifying, within the reduced model, a cluster of interest corresponding to the user's point of gaze;
identifying a region within the initial model corresponding to the identified cluster of interest; and
identifying the object based at least in part on the region identified within the initial model and the point of gaze of the user.

2. The apparatus of claim 1, further comprising an illumination source configured to illuminate the user's eye.

3. The apparatus of claim 2, where the illumination source is an infrared light emitting diode.

4. The apparatus of claim 3, where the eye tracking camera further comprises an infrared pass filter.

5. The apparatus of claim 1, where the eye tracking camera and scene camera are mounted on a wearable headset.

6. The apparatus of claim 1, where the scene camera is an RGB-D camera.

7. A mobile point of gaze apparatus capable of being mounted to the head of a user, the apparatus comprising:
a means for tracking movement of an eye;
a means for imaging a scene; and
a means for using information gathered by the means for tracking and information from the means for imaging to identify an object seen by the eye, wherein the object seen by the eye is identified by:
generating an initial model of the scene using the information from the means for imaging the scene;
generating a reduced model of the scene that omits one or more portions of the initial model, wherein the one or more portions of the initial model that are omitted from the reduced model correspond to portions that are not used to identify objects within the initial model;
identifying one or more clusters within the reduced model; and
identifying, within the reduced model a cluster of interest corresponding to the object seen by the eye;
identifying a region within the initial model corresponding to the identified cluster of interest; and
identifying the object based at least in part on the region identified within the initial model.

8. The apparatus of claim 7, further comprising a means for mounting the means for tracking and means for imaging to a user's head.

9. A method for estimating a point of gaze, the method comprising:
tracking movement of a user's eye with an eye tracking camera;
obtaining a three-dimensional image and a two-dimensional image in a direction of a user's gaze; and
identifying an object in a point of gaze of the user using the eye tracking camera, three-dimensional image, and two dimensional image, where identifying the object comprises:
calculating a plurality of geometric classification match scores between the object and a plurality of reference objects;
calculating a plurality of keypoint match scores between the object and the plurality of reference objects;
calculating a plurality of histogram comparison scores between the object and the plurality of reference objects; and
identifying the object based on a sum of a geometric classification match score, a keypoint match score, and a histogram comparison score between the object and each reference object.

10. The method of claim 9, where tracking the movement of the user's eye comprises measuring a corneal reflection of the user's eye.

11. The method of claim 9, further comprising calibrating the eye tracking camera before tracking the movement of the user's eye.

12. The method of claim 9, where the user's point of gaze is calculated using a pupil tracking algorithm.

13. The method of claim 9, where identifying the object comprises:
identifying a Euclidean cluster in the three-dimensional image closest to the user's point of gaze;
identifying a region of interest in the Euclidean cluster; and
identifying a shape of the object from points in the region of interest.

14. The method of claim 13, where the identification of the shape of the object is performed using a random sample consensus (RANSAC) algorithm.

15. The method of claim 13, further comprising using a region of the two-dimensional image corresponding to the Euclidean cluster to identify the object.

16. The method of claim 15, where the region of the two-dimensional image is compared to a reference image.

17. The method of claim 16, where the comparison is performed using a speeded up robust features (SURF) method.

18. The method of claim 9, where identifying the object further comprises comparing a histogram of a region of the two-dimensional image near the point of gaze to a reference histogram.

19. The method of claim 9, where the sum is a weighted sum.

* * * * *